April 1, 1924.  
C. BORNMANN  
LIGHT TRAP FOR BOX CAMERAS  
Filed Sept. 5, 1922

1,489,190

INVENTOR  
CARL BORNMANN  
BY  
Philip S. Hopkins  
ATTORNEY

Patented Apr. 1, 1924.

1,489,190

UNITED STATES PATENT OFFICE.

CARL BORNMANN, OF BINGHAMTON, NEW YORK, ASSIGNOR, BY MESNE ASSIGNMENTS, TO ANSCO PHOTOPRODUCTS, INC., OF NEW YORK, N. Y., A CORPORATION OF NEW YORK.

LIGHT TRAP FOR BOX CAMERAS.

Application filed September 5, 1922. Serial No. 586,125.

*To all whom it may concern:*

Be it known that I, CARL BORNMANN, a citizen of the United States, and a resident in the city of Binghamton, county of Broome, and State of New York, have invented a new and useful Improvement in Light Traps for Box Cameras, of which the following is a description, reference being had to the accompanying drawings, in which like reference numerals indicate like parts.

The principal object of this invention is to provide a positive light trap around the lens cell in a box camera, which excludes light from the film chamber. Frequently, due to warped boards which comprise the present construction of film carrying frames, or to loose fitting parts between said frame and the lens cell, light is permitted to escape from said lens cell into the film chamber, destroying the film. To prevent this undesirable condition I have designed a light trap, simple in construction and positive in operation which comprises coacting parts between the shutter board or partition carrying the lens cell, and the inner end of the film carrying frame or cone.

A further object is to substantially reduce the material used in the present type of box camera, without sacrificing any necessary feature thereof.

A still further object is to construct a camera of this type which is distinctive in its compactness, the few parts thereof being so located and positioned relatively to each other that the entire organization may be embodied in a very small camera box, and yet the arrangement is such that adequate space is afforded for all the necessary parts.

It is also an object of this invention to so construct the parts of the camera that a high degree of stability and rigidness is obtained, thus preventing vibration or shaking loose of members due to rough handling of the camera.

Another and important object is to utilize the light trap as a centering means for the film carrier. By this means great accuracy is obtained in positioning and holding the film carrying member in proper relation to the lens, and in exact and positive position to receive the winding key.

Other objects and advantages in details of construction and operation will appear as the description proceeds.

Figure 1:
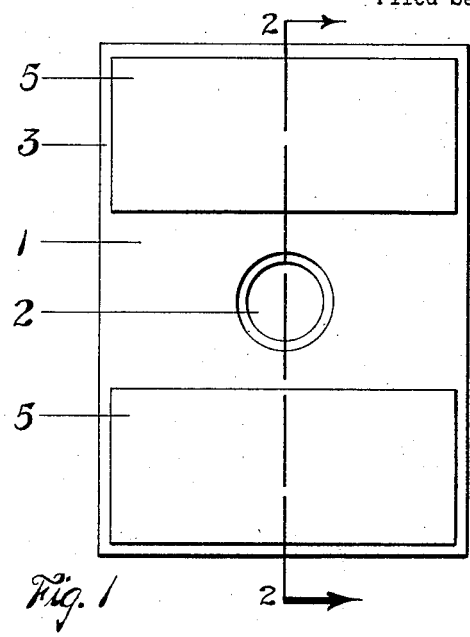
Figure 1 is a face view of the shutter board or partition.

The reference numeral 1 refers to the shutter board or partition in the center of which is bored the lens cell 2. A flange 3 projects from and around the outer edge of the board. This flange fits into a cooperating recess in the camera box and serves to hold the partition in position and also to exclude light from around the edges of the partition. This structure is clearly shown in Figure 3.

Figure 2:
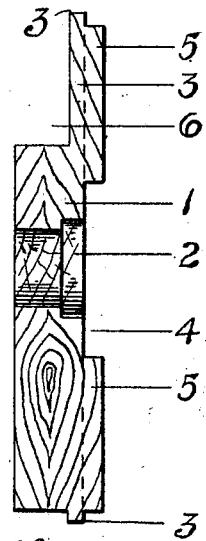
Figure 2 is a section thereof taken on the line 2—2 of Fig. 1.

The inner face of the partition, (the right hand side in Figures 2 and 3) is provided centrally thereof with a recess 4 which is cut into the board horizontally across the same. As shown, the lens cell 2 falls in the center of this recess. The forming of this recess 4 leaves the parts 5—5 projecting inwardly from the partition, for a purpose to be described.

The outer face of the partition is provided with the recess 6 for the reception of the finder plates (not shown). It is also on the face of this partition that the shutter, also omitted, is mounted.

It will be readily observed that the structure of the parts described is exceedingly simple in construction and can be cheaply manufactured. The entire partition 1 with its parts just described, is in one piece, the recesses, etc., therein being cut out.

Figure 3:
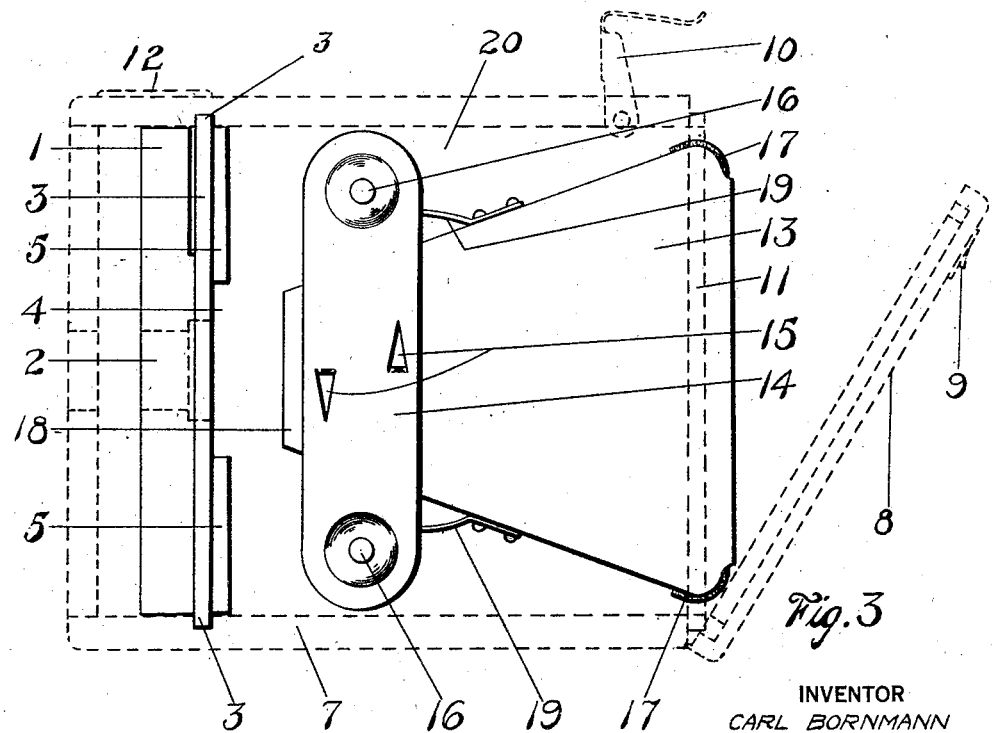
Figure 3 is a side view of the partition in position within a camera box shown in dotted lines, and with the film carrying cone moved from its cooperating position with the partition.

In Figure 3 is shown in dotted lines the camera box 7 having a hinged door 8 provided with a lug 9 which cooperates with a suitable catch 10 mounted upon the top of the box. This permits the opening of the box and affords access to the inner parts thereof.

11 designates a flange on the rear end of the camera box which cooperates with a recess (not shown) in the cover 8, providing a light tight cover. 12 indicates the finder in the top of the box.

The film carrying cone or frame is indicated by the numeral 13. This cone is removable from the camera box and has on the sides thereof the spring metal spool holders 14 secured thereto by pins or lugs 15 struck out of the holders.

16—16 indicate the trunnions of film spools within the holders 14. 17—17 indicate strips of velvet glued or otherwise secured to the back edges of the cone, over which the film is drawn when wound from one spool to the other. 19—19 indicate film tension springs mounted on the top and bottom of the cone.

It will be noted by reference to Fig. 3 that the front or inner end 18 of the cone which is beveled, projects beyond the holders 14 a distance equal to the depth of the recess 4. When the cone is loaded with a film and pushed into the box the full distance, the end 18 fits snugly within the recess 4, thus positively excluding light from the lens cell to the film chamber 20.

From the foregoing description it will be readily observed that by virtue of the co-acting film carrying cone and partition board, great simplicity in construction is obtained, particularly in that the front board on the usual type of film carrying cone is eliminated, thus making a construction of lighter weight and fewer parts.

This co-action between the film carrying cone and the partition, besides furnishing the above mentioned advantages, provides still further features which assist in making this camera highly efficient in constructions and co-operation. One outstanding feature is that of providing a centering means for the film carrier. When the cone 13 is "loaded" with a film and placed in the camera box, the end 18 immediately slips into the recess 4 and because of the location of the recess relative to the lens cell, the cone is positioned and held in correct relation thereto, thus bringing the film into accurate alignment with the lens. This co-operation also positively brings the film spool into accurate alignment with the winding key (not shown).

As the operation of the device is obvious, no detailed description thereof is necessary.

Of course the form shown and described above is to be taken as illustrative only, for obviously the device is susceptible to various changes in details of construction without departing from the scope of the invention. I do not limit myself therefore to the form shown, other than by the appended claims.

I claim:

1. A photographic camera comprising in combination a camera box, a partition in said box having a lens cell therein, a removable film carrying cone member within said box, said partition provided with means cooperating with said cone member to exclude light from said lens cell.

2. A photographic camera comprising in combination a camera box, a partition in said box having a lens cell therein, a film carrying cone member within said box, and a light trap formed by the inner end of said cone member and said partition.

3. A photographic camera comprising in combination a camera box, a partition in said box having a lens cell therein, said partition being recessed around said lens cell, a removable film carrying frame in said box, the inner end of which fits into said recess, thereby forming a light trap around said lens cell.

4. A photographic camera comprising in combination a camera box, a partition in said box provided with a longitudinal recess from edge to edge thereof, said partition also provided with a lens cell centrally of said recess, a film carrying cone in said box, spool carriers on said cone, the inner end of said cone protruding beyond said spool carriers and fitting into said recess, forming a light trap around said lens cell.

5. A photographic camera comprising in combination a camera box, a partition in said box, a film carrying member in said box, said partition provided with centering means for said film carrying member.

6. A photographic camera comprising in combination a camera box, a single partition in said box, a film carrying frame in said box, the said partition provided with means engaging the inner end of said frame for centering the same within the box.

7. A photographic camera comprising in combination a camera box, a partition in said box provided with a recess, a film carrier in said box and means on the film carrier engaging in said recess whereby said carrier is centered within said box.

8. A photographic camera comprising in combination a camera box, a partition in said box, a film carrying frame in said box, said partition provided with a single means cooperating with the film carrying frame to provide a light trap and a centering device for said frame.

9. A photographic camera comprising in combination a camera box, a single partition in said box, a film carrier in said box, the inner end of said carrier being smaller than the outer end thereof, thereby forming a film chamber within said box; said inner end co-operating with said partition to provide a light trap and a centering device for said carrier.

10. A photographic camera comprising in combination a camera box, a shutter board in said box provided with a recess, a film carrying frame having a beveled end in said box, said beveled end of said frame engaging in said recess when said frame is placed in the box, whereby said frame is centered in said box.

11. A photographic camera comprising in combination a camera box, a shutter board in said box provided with a lens cell, said board also provided with a recess around said lens cell, a film carrying frame having its inner end beveled and adapted to enter said recess, said inner end and said recess providing a centering means and light trap for said film carrying frame.

12. A photographic camera comprising in combination a camera box, a single one piece partition and shutter board in said box, a film carrying frame, said board provided with means for centering said frame and excluding light from around the same.

CARL BORNMANN.